Patented Oct. 4, 1949

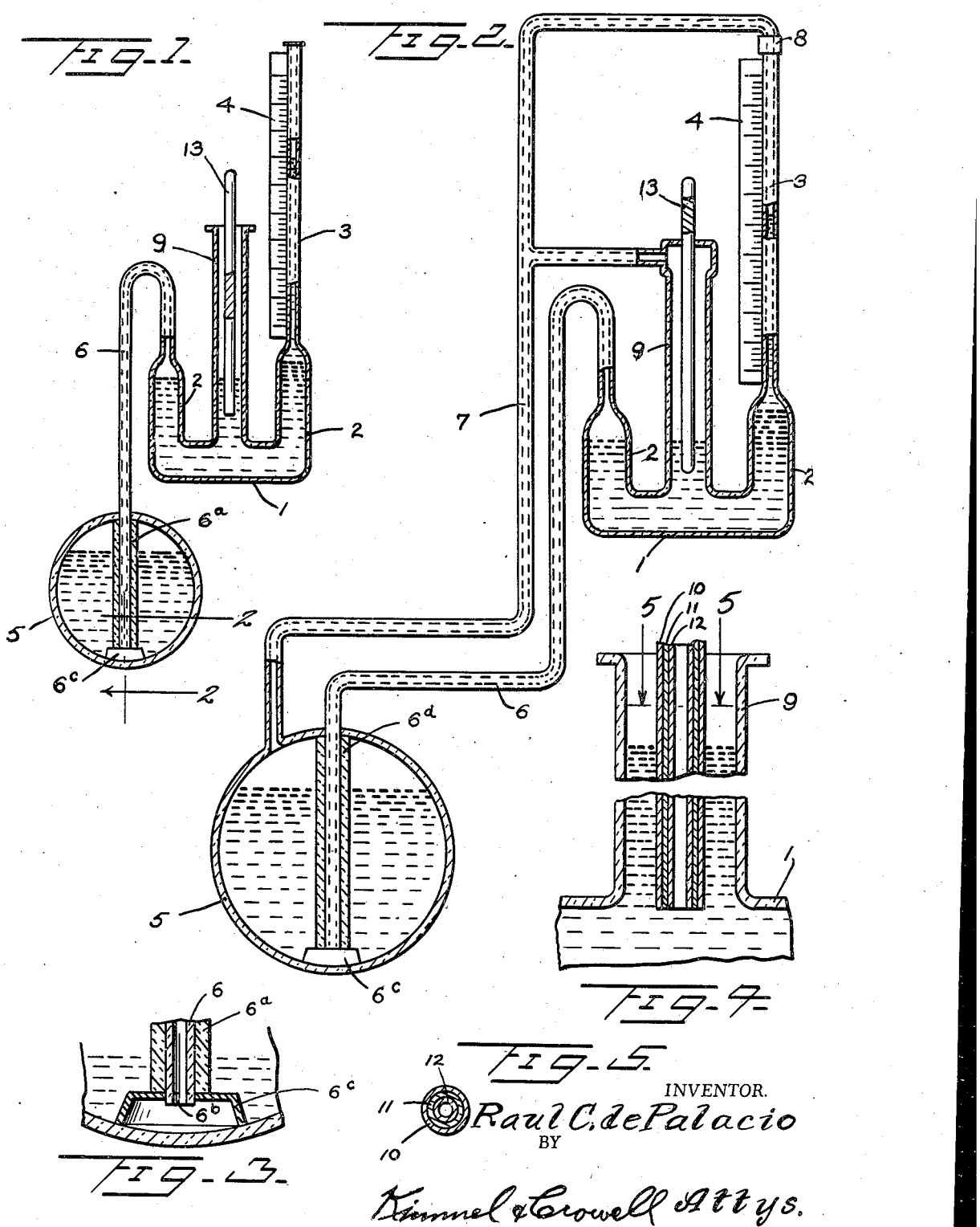

2,483,532

UNITED STATES PATENT OFFICE 2,483,532

AUTOMATIC LEVEL GAUGE FOR LIQUIDS CONTAINED IN TANKS

Raúl Calderón de Palacio, Mexico City, Mexico

Application February 19, 1945, Serial No. 578,612
In Mexico March 1, 1944

4 Claims. (Cl. 73—299)

This invention relates to an improved device in automatic level gauges for liquids contained in tanks or vessels, preferably stationary, which are characterized by being formed by a system of conduits, tubes or receptacles interconnected, containing in the system a certain quantity of mercury which varies in its level when the quantity of liquid related to it and which is in the tank or vessel increases or diminshes, the height which the level reaches being varied by the pressure in a tube located at the bottom of the tank and connected at the end of a tube of the system in which the mercury is contained. This system besides, has in the end of another of the tubes which form it an extension made up by another tube of smaller diameter and in which a colored liquid of less specific gravity has been lodged, which indicates clearly and in an amplified form the variation of the mercury contained in the tube of larger diameter, thus enabling the variations of the level of the liquid contained in the tank to which the gauge is related to be detected and read with accuracy and greater facility.

Until now, certain level gauges have been employed based in the fluctuation of the correlative level of the mercury contained in a tube of uniform diameter, by means of the pressure exerted in the tank or vessel, the contents of which are to be measured; the use of these gauges does not permit to ascertain with accuracy the correct measure of the vessel, since the variation of the level of the mercury contained in the tube of uniform diameter is rather small, in comparison with the correlative height of the liquid contained in the tank and depending strictly on the relation of the density between the liquid contained in the tank and the mercury, for which reason it was thought to improve these means by reducing one of the extremes of the indicator tube in which the mercury is contained and placing in the other end a liquid of less specific gravity and of a distinguishable color which reaches proportionally higher variations in its level, since this liquid is contained partly in the tube of large diameter and partly in the one of smaller diameter, therefore amplifying in the latter the movements of the mercury caused by the variations of the hydrostatic pressure of the fluid contained in the tank when varying of level, thus resulting with this improvement an advantage with respect to all known until now, since it is feasible to determine at first sight, by means of the direct indication in the tube of smaller diameter in which the colored liquid is contained and/or, aided by a complementary scale, placed close to this tube, to detect very small variations of level in the liquid contained in the tank.

Another advantage which has been attained by the application of the improved gauges which are herein described is that which enables to observe or determine in other or different locations of the receptacles, the levels of the liquids contained therein to which the gauges are applied, it being, furthermore, feasible to use them for liquids of different specific gravities, such as water, oil, gasoline, alcohol, syrups or the like, whether fluids or viscous or even subject to different atmospheric pressures, it being necessary in this case to prolong and connect the open ends of the tubes which form the system, to a tube or common passage which must reach directly the receptacle or vessel, thus equalizing the pressure of the mercury column and consequently that of the colored liquid, used as an indicator, to that to which the liquid contained in the tank is applied.

In order to avoid the necessity to calculate each level indicator to relate it with receptacles of different capacities or heights, and/or, which contain liquids of different specific gravities, a complementary tube or deposit has been used, which forms a branch of the system of tubes which constitute the gauge; varying the diameter section or capacity of this tube which forms the branch. The variation of the mercury level contained in the tubes which constitute the system can be controlled as well as the height which the column of the colored liquid contained in the tube of smaller diameter must reach, to relate at will said height to that of the fluid contained in the receptacle. One of the forms which can be used to vary the diameter or capacity of the branch tube is using telescopic tubes which are adjusted to the interior of the branch tube and in substitution or combination, nuclei solid rods or suitable elements which are introduced within the branch tube till they get in contact with the mercury level or penetrate it, thus enabling to adjust also the higher level of the colored liquid column, with respect to its point of origin or zero point of the indicating scale when the tank to be measured is empty or contains no fluid.

The characteristic features of the invention are disclosed in the following description and the attached drawings illustrating said description, and using the same reference figures to indicate the same parts shown on the drawings.

Figure 1 is a cross section illustrating the assemblage of the level gauge and it shows the tubes, receptacles or deposits interconnected and which form the system that constitute the indicator which must be connected to the tanks subject to measuring by means of the tubes aforementioned, and this figure also shows the mercury lodged in said system and which must show, by means of a tube of smaller diameter which extends from one of its branches and which contains a colored liquid, the height or level of the liquid contained in the tank to which the gauge is applied.

Figure 2 is a modification of the preceding figure in which are connected the open ends of the system which form the level gauge to a common tube connected directly to the tank subject to measuring when this latter has a different pressure to that of the atmosphere.

Figure 3 is an enlarged fragmentary view in section showing a portion of my device.

Figure 4 is a modification of the device shown in Figure 1.

Figure 5 is a transverse section taken on the line 5—5 of Figure 4.

The automatic level gauge, as illustrated in the drawings, comprises a tube 1, of adequate material, preferably of translucid or transparent material, bent in such a form as to constitute various communications which form the system in which a certain quantity of mercury is contained, stretching at its end 2 into one or several branches, with a tube of smaller diameter 3, containing among these a colored liquid of less specific gravity, which serves to indicate by itself or aided by the scale 4, the variations of level of the liquid contained in the tank 5, which is reached by a tube 6, which can be protected by a thermic or heat insulating covering 6a, when the liquid contained in the tank has a different or varying temperature with respect to that of the atmosphere.

Also the tube 6, can have an amplification on its end 6b, in combination with a diaphragm 6c which prevents the access of vapors when the tank contains volatile fluids, it being necessary to employ in this instance a sensitive diaphragm that will allow the transmission of the variations in pressure without being affected by the passage of the vapors or gases emanating from the volatile fluids.

The tube 6, reaches to the bottom of tank 5, using for the indication, the hydrostatic pressure of the liquid contained in tank 5, exerted on the mercury column lodged in the system of tubes shown in 1, through the air contained in tube 6, since when the quantity of liquid contained in container 5 increases or diminishes, it will force simultaneously the mercury column to reach a higher or lower level, as well as the column of colored liquid contained in the smaller tube 3.

When tank 5 is subject to a pressure different from that of the atmosphere, an optional tube 7 as seen in Figure 2 has been provided which connects the end 8, of the tube 3, as well as the end of tube 9, to the gas space of tank 5, to equalize the pressures and obtain only the measure of the exerted pressure of the fluid contained in the receptacle 5. As explained by the aforesaid, the maximum height which the column of the colored liquid must reach in the tube 3 of smaller diameter, or, in other words, the length of the scale 4, depends on two things, namely: of the maximum height reached by the liquid contained in the vessel and of the relation of diameter or transversal section of the larger tube in which the mercury is contained and part of the colored liquid and the diameter or transversal section of the smaller tube, in which the other portion of the colored liquid is contained, since it is clear that when reaching a certain height, the mercury of the larger tube 2, displaces certain volume of the colored liquid which passes to the smaller tube 3, occupying in the latter a greater height which depends on the relation mentioned and which might be called relation of multiplication of the apparatus. In order that the apparatus have a constant scale length for tanks of varying heights and/or, containing liquids of different specific gravities, it should be necessary to calculate for each case a relation of adequate multiplication, this being extremely complicated and impractical. To overcome this difficulty, the following has been done: to a device as the one already described, and with a given relation of multiplication, a tube 9 has been added as a derivation communicated with the others which form the system in which the mercury is contained and which might be called, for example, regulating vase, since this is really its function. This tube or derivation 9, generally will be of larger diameter than those which complete the system, for, by its use, it may be possible to regulate or relate to a scale of constant length, the different hydrostatic pressures of tanks of different heights (considering these when they are full), thus enabling to regulate and balance the colored liquid which must always reach the higher end of the common scale of the apparatus.

To have the colored liquid reach the higher end of the scale, it will be necessary that the mercury level contained in tube 2 rises to a given height; to equalize the combined pressure of the mercury and the colored liquid, it is necessary that in the derivation formed by tube 9, the level of the mercury be raised to a given height and the level of same lowered in tube 1, where the equilibrium is obtained with the hydrostatic pressure exerted by the liquid contained in the tank subject to measuring. The volume of the mercury displaced in tube 1, is distributed through tubes 2 and 9, or, in other words, the total of the volumes of the mercury displaced in these tubes 2 and 9 is equal to the volume of the mercury displaced in tube 1, and the hydrostatic pressure exerted by the liquid contained in tank 5, is equilized with the difference of mercury levels between the tubes 1 and 9 and 1 and 2, plus the column of colored liquid.

For different hydrostatic pressures produced by different heights of the tank 5, considering these to be always full, various differences in heights are obtained between the levels of mercury contained in the tubes 1 and 2; but, as already said, the levels reached by the mercury in tubes 2 and 1, must be fixed and determined; therefore, the only level which will descend to different heights will be that of the mercury contained in tube 1, provided the condition is followed that the sum of the volumes of mercury displaced in tubes 2 and 9, is equal to the volume of mercury displaced in tube 1, a condition that is easily complied with by varying the section or capacity of tube 9, by which it is possible to vary the volume of the mercury displaced in said tube 9, and therefore it will have been possible to have the mercury raise to the proper heights in tubes 2 and 9, with different displacements in tube 1. A form of manner of varying the section or capacity of tube 9 is by introducing in it a combination or substitution, concentric telescopic tubes 10, 11, and 12 as seen in Figures 4 and 5 and/or, solid rods 13, as seen in Figures 1 and 2 of different diameters with which the two conditions of equilibrium can be satisfied; that of the hydrostatic pressure exerted by the liquid contained in tank 5, with the differences in height of the mercury levels between tubes 1 and 9, and 1 and 2, plus the height of the colored liquid, and that the volume of the mercury displaced in tube 1 be equal to the sum of the volumes of mercury displaced in tubes 2 and 9.

When tank 5, which contains the liquid whose weight, volume or density has to be gauged, is found at a different pressure other than atmospheric, conduits or tubes such as 12 will be used, which will connect to the gas space of the tank subject to gauging with the ends of each one of the tubes 3 and 9, and which usually are open to the atmosphere when the liquid contained in the tank is also free to the atmosphere and not subject to a different pressure.

I claim:

1. A tank gauge comprising a horizontally disposed tubular member, a pair of upwardly extending tubular columns one at each end of said first named member, mercury in said tubular member and extending partly into said columns, a pipe communicating one of said columns with a tank, an indicating column extending coaxially from the other one of said columns and having a smaller diameter than said other column, an intermediate column between said pair of columns, said mercury also extending partly into said intermediate column, and a calibrating member in said intermediate column and adjustable lengthwise thereof.

2. A tank gauge comprising a horizontally disposed tubular member, a pair of upwardly extending tubular columns one at each end of said first named member, mercury in said tubular member and extending partly into said columns, a pipe communicating one of said columns with a tank, an indicating column extending coaxially from the other one of said columns and having a smaller diameter than said other column, an intermediate column between said pair of columns, said mercury also extending partly into said intermediate column, a calibrating member in said intermediate column and adjustable lengthwise thereof, a pipe connecting the upper end of said indicating column with said tank, and a pipe connecting said intermediate column with said latter named connecting pipe.

3. A tank guage comprising a horizontal tubular member, a vertically extending tubular column at each end of said member and communicating therewith, a reduced diameter indicating tube formed coaxially with and extending upwardly from one of said columns, a vertically extending calibrating column communicating with said member intermediate the ends thereof, mercury in said member and extending partly into said tubular columns and said calibrating column, a pipe connecting the other of said tubular columns with a tank, and calibrating rod means disposable in said calibrating column and adapted to vary the cross sectional area of said calibrating column.

4. A tank guage comprising a horizontal tubular member, a vertically extending tubular column at each end of said member and communicating therewith, a reduced diameter indicating tube formed coaxially with and extending upwardly from one of said columns, at least one vertically disposed tubular calibrating column communicating with said member, mercury in said member and extending partly into said tubular columns and said calibrating column, a pipe connecting the other of said tubular columns with a tank, and calibrating rod means disposable in said calibrating column and adapted to vary the cross sectional area of said calibrating column.

RAÚL CALDERÓN DE PALACIO.

REFERENCES CITED

The following references are of record in the file of this patent:

UNITED STATES PATENTS

| Number | Name | Date |
|---|---|---|
| 813,096 | House | Feb. 20, 1906 |
| 1,257,965 | Bailey | Mar. 5, 1918 |
| 1,361,142 | Cook | Dec. 7, 1920 |
| 1,442,134 | Dunajeff | Jan. 16, 1923 |
| 1,499,759 | Bacharach | July 1, 1924 |
| 2,337,171 | Winton | Dec. 21, 1943 |

FOREIGN PATENTS

| Number | Country | Date |
|---|---|---|
| 839,749 | France | Jan. 7, 1939 |